United States Patent
Yoshida et al.

(10) Patent No.: US 8,345,029 B2
(45) Date of Patent: Jan. 1, 2013

(54) IMAGE DISPLAY DEVICE

(75) Inventors: Tomonori Yoshida, Moriguchi (JP); Jiaqiang Sun, Shenzhen (CN)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 0 days.

(21) Appl. No.: 12/959,326

(22) Filed: Dec. 2, 2010

(65) Prior Publication Data

US 2011/0069097 A1    Mar. 24, 2011

Related U.S. Application Data

(63) Continuation of application No. PCT/JP2009/058323, filed on Apr. 28, 2009.

(30) Foreign Application Priority Data

Jun. 5, 2008    (JP) .................................. 2008-148211

(51) Int. Cl.
G06F 3/038    (2006.01)
(52) U.S. Cl. .......................... 345/204; 345/3.4; 348/554
(58) Field of Classification Search .................. 345/204, 345/1.1–1.3, 2.1–2.3, 3.1–3.3, 2.1–2.2
See application file for complete search history.

(56) References Cited

U.S. PATENT DOCUMENTS

2007/0182443 A1 * 8/2007 Funada .......................... 324/770

FOREIGN PATENT DOCUMENTS

| JP | 2002-320243 A | | 10/2002 |
|---|---|---|---|
| JP | 2003-046907 A | | 2/2003 |
| JP | 2004-021054 A | | 1/2004 |
| JP | 2004-254232 | * | 9/2004 |
| JP | 2004-254232 A | | 9/2004 |
| JP | 2006-133557 A | | 5/2006 |
| JP | 2006-154836 A | | 6/2006 |
| JP | 2007-241261 A | | 9/2007 |
| JP | 2008-309821 A | | 12/2008 |

OTHER PUBLICATIONS

International Search Report issued Aug. 11, 2009 in parent application PCT/JP2009/058323.

* cited by examiner

*Primary Examiner* — Duc Dinh
(74) *Attorney, Agent, or Firm* — NDQ&M Watchstone LLP

(57) ABSTRACT

An image display device includes an input unit having a common terminal for receiving a component signal and an analog RGB signal and a display control unit for controlling display conforming to predetermined standards when the signal inputted from the input unit is a component signal. Thus, when the inputted signal is a component signal, display control conforming to predetermined standards (desirably, the EIA standards) is performed, thereby realizing appropriate image display.

13 Claims, 6 Drawing Sheets

FIG.2

| STANDARD | EIA | | STANDARD OTHER THAN EIA (VESA, ETC.) | |
|---|---|---|---|---|
| DATA NAME | 480P | 720P/60 | (V1) | (V2) |
| RESOLUTION | 640 × 480 | 1280 × 720 | 640 × 480 | 1280 × 720 |
| HORIZONTAL FREQUENCY (kHz) | 31.47 | 45.00 | 31.44 | 44.772 |
| VERTICAL FREQUENCY (Hz) | 59.93 | 60 | 59.88 | 59.885 |
| DOT CLOCK (MHz) | 24.544 | 74.25 | 25.15 | 74.5 |
| TOTAL HORIZONTAL DOTS (dots) | 780 | 1650 | 800 | 1664 |
| HORIZONTAL DISPLAY PERIOD (dots) | 640 | 1280 | 640 | 1280 |
| HORIZONTAL FRONT PORCH (dots) | 18 | 110 | 16 | 64 |
| HORIZONTAL BACK PORCH (dots) | 58 | 220 | 48 | 192 |
| HORIZONTAL SYNCHRONIZATION PERIOD (dots) | 64 | 40 | 96 | 128 |
| TOTAL VERTICAL LINES (lines) | 525 | 750 | 525 | 748 |
| VERTICAL DISPLAY PERIOD (lines) | 480 | 720 | 480 | 720 |
| VERTICAL FRONT PORCH (lines) | 9 | 5 | 10 | 3 |
| VERTICAL BACK PORCH (lines) | 30 | 20 | 33 | 20 |
| VERTICAL SYNCHRONIZATION PERIOD (lines) | 6 | 5 | 2 | 5 |

IMAGE DISPLAY DEVICE

This application is a continuation application of Patent Cooperation Treaty Patent Application No. PCT/JP2009/058323 (filed on Apr. 28, 2009), which claims priority from Japanese patent application JP 2008-148211 (filed on Jun. 5, 2008). All of which are hereby incorporated by reference herein.

TECHNICAL FIELD

Present invention relates to an image display device that displays images, and particularly relates to an image display device that handles image signals of different signal formats.

BACKGROUND ART

In recent years, triggered by a widespread use of DVDs or personal computers etc., there has been an increasing demand for image display devices which can handle image signals of different signal formats. For example, the image display devices which allow the input of both a component format signal having Y, Pb, and Pr signals and an analog RGB format signal including analog RGB signals and synchronization signals (H, V) have been growing in demand. Regarding to the component format, so-called a RCA terminal is typically used for inputting the signal, and for the analog RGB format, a D-Sub 15-pin terminal typically is used for inputting the signal.

Depending on the type of equipment connected to a device (such as commercial video display device), it is requested to employ a so-called BNC terminal instead of the above-mentioned terminals. In such a case, terminals for the component format and terminals for the analog RGB format can be provided separately. However, for reducing space on a substrate or a terminal strip, and for reducing a cost (by omitting terminals and a switching circuit), the Y, Pb, and Pr terminals for inputting a component format signal and G, B, and R terminals for inputting an analog RGB format signal may be shared. Such shared terminals used as input terminals adaptive for different signal formats are disclosed in, for example, JP-A-2004-21054 and JP-A-2007-241261.

According to the above-mentioned image display device having shared terminals, although it is advantageous in terms of reducing space, it is requested that the display can appropriately determine the signal format of an inputted image signal. This is because processing executed in the image display device differs between the image signal of the component format and of the analog RGB format.

One of the reason of the difference is that the image signal of the component format and of the analog RGB format are based on different standards regarding to the timing information of the signal, such as a dot clock or a front porch. Specifically, the timing information in the component format bases on the EIA (Electronic Industries Alliance) standard basically, whereas the timing information in the analog RGB format may base on wide variety of standards. Thus, it is difficult to pre-register timing information relating to various standards regarding to the analog RGB format in an image display device. Here, the timing information represents various timing information, such as a horizontal frequency, a vertical frequency, a dot clock, or a front porch, to which is referred in order to process image signals appropriately.

Further, in the analog RGB format, image signals conforming to an identical standard but different type (different in resolution, etc.) may be analogous in H (horizontal frequency) and V (vertical frequency) to one another in some cases. For example, as shown in Table 1, an image signals conforming to the VESA (Video Electronics Standards Association) standard with a resolution of 1024×768, 1366×768, 1360×768 and 1280×768 respectively, are analogous in H and V to one another.

TABLE 1

| Resolution | Horizontal Frequency H (KHz) | Vertical Frequency V (KHz) |
| --- | --- | --- |
| 1024 × 768 | 48.36 | 60.00 |
| 1366 × 768 | 48.36 | 60.01 |
| 1360 × 768 | 47.73 | 60.03 |
| 1280 × 768 | 47.78 | 59.87 |

Therefore when an image signal of the analog RGB format is inputted to the image display device, it may be difficult to identify its type among pre-registered timing information accurately, based on, H and V of the inputted image signal. Thus, in order to achieve an appropriate processing of the image signal, it is required that the content of identified timing information is adjustable afterwards.

On the other hand, when an image signal of the component format is inputted to the image display device, it is relatively easy to identify the timing information corresponding to the inputted image signal because since it is given that the image signal conforms to the EIA standard. Thus, the above-described adjustment of timing information is unnecessary, and further, when such adjustment is performed, it might cause a useless processing load. Further, in the EIA standard, H and V are not set similar between signals of different format, and thus the above-described identification is relatively easy.

Hence, the necessity of the adjustment of timing information differs depending on the signal format of the image signal inputted to an image display device. Furthermore, when an inputted image signal is in the component signal format, an appropriate image display is realized due to a display control based on a predetermined standard (preferably, the EIA standard).

SUMMARY OF THE INVENTION

An image display device according to the present invention includes: an input portion which has a shared terminal used for inputting a component signal and a RGB signal; and a display control portion which, if a signal inputted through the input portion is the component signal, performs display control based on a predetermined standard.

BRIEF DESCRIPTION OF DRAWINGS

[FIG. 2] is an explanatory diagram relating to a timing information table.

DESCRIPTION OF THE PREFERRED EMBODIMENTS

Hereinafter, embodiments of the present invention is described referring to Examples 1 to 3.

EXAMPLE 1

The following describes one embodiment (Example 1) of the present invention by referring to an image display device that displays images based on inputted image signals.

Figure 1:
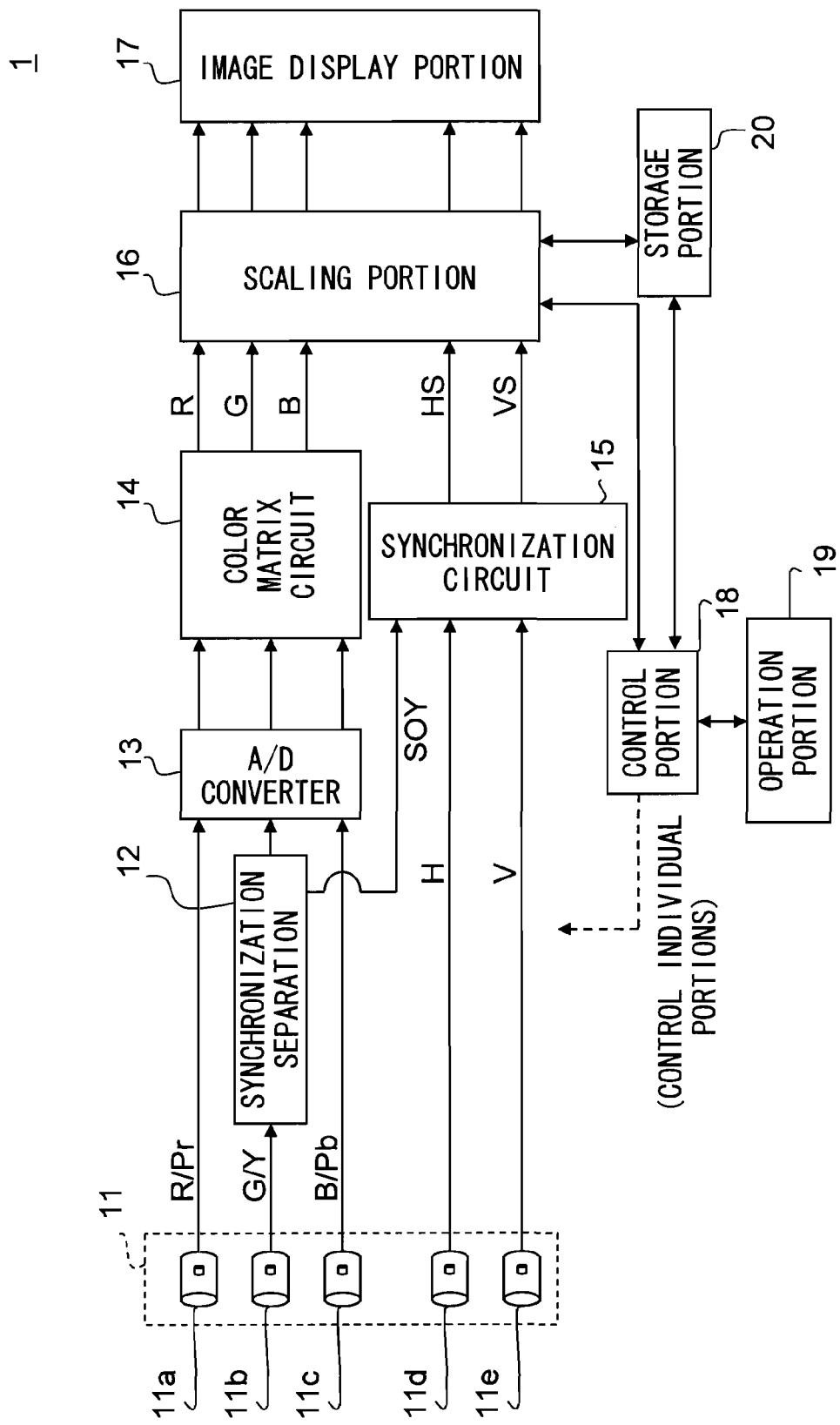
[FIG. 1] is a structural view of an image display device relating to Example 1 of the present invention.

FIG. 1 shows a structural view (block diagram) of the image display device. As shown in this figure, an image display device 1 includes an input terminal 11, a synchronization separation circuit 12, an A/D converter 13, a color matrix circuit 14, a synchronization circuit 15, a scaling portion 16, an image display portion 17, a control portion 18, an operation portion 19, a storage portion 20, etc.

The input terminal 11 is a terminal used for inputting image signals from the connected external device (for example, a tuner or a PC main body), and it is composed of at least five terminals that are a first terminal 11a, a second terminal 11b, a third terminal 11c, a fourth terminal 11d, and a fifth terminal 11e.

Thus, the image display device 1 can alternatively accept the input of an image signal of an analog component signal format including at least three types of signals (Y, Pb, and Pr signals) (hereinafter, referred to as the "component format") and an image signal of a signal format including at least five types of signals (analog RGB signals (R, G, B) and analog horizontal and vertical synchronization signals (H, V)) (hereinafter, referred to as the "analog RGB format").

More specifically, in a case where an image signal of the component format is inputted, the first to third terminals (11a to 11c) are connected to terminals of the external device, and from the external device, a signal Pr, a signal Y, and a signal Pb are inputted to the first terminal 11a, the second terminal 11b, and the third terminal 11c, respectively. In a case where an image signal of the analog RGB format is inputted, the first to fifth terminals (11a to 11e) are connected to the terminals of the external device, and from the external device, a signal R, a signal G, a signal B, a signal H, and a signal V are inputted to the first terminal 11a, the second terminal 11b, the third terminal 11c, the fourth terminal 11d, and the fifth terminal 11e, respectively.

With regards to the signals included in the image signal of the component format, Y represents a luminance signal, and Pb and Pr represent color-difference signals. Regarding to signals included in the image signal of the analog RGB format, R, G, and B represent luminance signals of respective colors, H represents a horizontal synchronization signal, and V represents a vertical synchronization signal. The first to third terminals (11a to 11c) can be said that they are the terminals (shared terminals) shared for inputting an image signal of the component format and for inputting an image signal of the analog RGB format. On the other hand, the fourth terminal and the fifth terminal (11d, 11e) can be said that they are the terminals (analog RGB dedicated terminals) used for inputting an image signal of the analog RGB format but not for the component format.

The synchronization separation circuit 12 extracts, when the signal Y is inputted through the second terminal 11b, a signal SOY representing horizontal synchronization and vertical synchronization from the signal Y, and then outputs it to the synchronization circuit 15. Further, a portion of the signal Y which relates to the luminance at least, is transmitted to the A/D converter 13. When the signal G is inputted, the signal G is transmitted to the A/D converter 13 without any extracting process.

The A/D converter 13 converts signals (analog signals) transmitted from the first to third terminals (11a to 11c) side into digital signals and then transmits them to the color matrix circuit 14.

The color matrix circuit 14 converts signals into the R, G, and B signals (luminance signals), when the Pr, Y, and Pb signals are inputted respectively, and transmits them to the scaling portion 16. When the R, G, and B signals are inputted to the color matrix circuit 14, the color matrix circuit 14 transmits these signals to the scaling portion 16 without any conversion.

The synchronization circuit 15 converts the signal SOY transmitted from the synchronization separation circuit 12 into a horizontal synchronization signal HS and a vertical synchronization signal VS and transmits them to the scaling portion 16. In a case where the signal H and the signal V are transmitted from the fourth terminal and the fifth terminal (11d, 11e), the synchronization circuit 15 transmits them to the scaling portion 16 as a signal HS and a signal VS, respectively, without any conversion.

The scaling portion 16 execute a predetermined signal processing to the R, G, and B signals transmitted from the color matrix circuit 14 and the HS and VS signals transmitted from the synchronization circuit 15 respectively, so as to generate signals for displaying an image on the image display portion 17. The signal processing executed in the scaling portion 16 is specifically described later.

The image display portion 17 is provided with a display and displays an image based on the signals transmitted from the scaling portion 16.

The control portion 18 is constituted by, for example, a microcomputer and controls various types of processing performed in the image display device 1 appropriately. The operation portion 19 is a user interface that operable by a user and is configured in the form of, for example, a remote control or operation button switches. Operational information obtained by the operation portion 19 is transmitted to the control portion 18. Thereby, the image display device 1 can perform processing that complies with the user's intensions.

According to the operation portion 19, the user can preset whether an image signal of the component format or an image signal of the analog RGB format should be inputted to the image display device 1. By setting the signal format of the image signal appropriately by the operation portion 19, the image display device 1 can determine a format of an inputted image signal (see processing at step S1, which is described later).

Moreover, by means of the operation portion 19, the user can instruct that an automatic adjustment of the timing information or a manual adjustment of the timing information be executed (see processing at step S23 and step S25, which is described later). The automatic adjustment and manual adjustment of timing information is described again later.

The storage portion 20 is constituted by, for example, a rewritable nonvolatile memory and stores various types of information relating to processing performed in the image display device 1. The information stored in the storage portion 20 is readable and rewritable by the scaling portion 16 or the control portion 18.

Furthermore, a timing information table containing a plurality of types of information such as timings relating to image signals (timing information) is pre-stored in the storage portion 20. That is, timing information of various image signals is registered in the image display device 1.

As shown in a table of FIG. 2, this timing information is composed of a plurality of items of information such as a resolution of an image, a horizontal frequency (horizontal synchronization frequency), a vertical frequency (vertical synchronization frequency), a dot clock (information representing a clock of an image signal), total horizontal dots, a horizontal display period, a horizontal front porch, a horizontal back porch, a horizontal synchronization period, total vertical lines, a vertical display period, a vertical front porch, a vertical back porch, and a vertical synchronization period. The timing information may further include an item such as a phase (an amount of a phase shift in an image signal relative to, for example, a synchronization signal).

As categories of the timing information registered, there are ones based on the EIA standard (e.g. ones having data labels "480P" or "720P/60") and ones based on a standard other than EIA such as, for example, VESA (e.g. ones having data labels "V1" and "V2"). As described later, this timing information is used for signal processing with respect to an inputted image signal.

Figure 3:
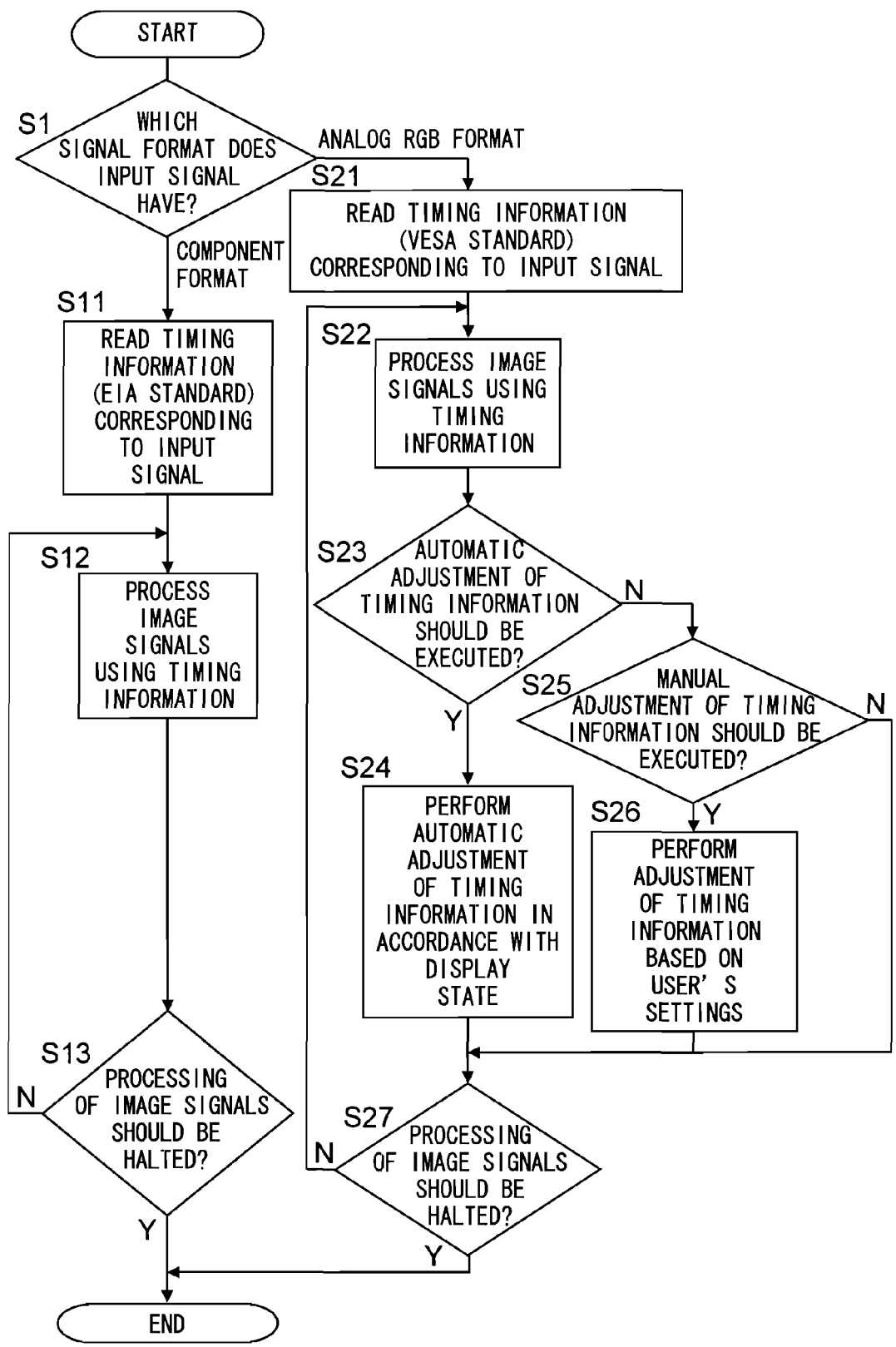
[FIG. 3] is a flow chart relating to processing of an image signal.

According to the above-described configuration, the image display device 1 receives an image signal of the component format or the analog RGB format and executes image display based on this image signal. Next, by referring to the flow chart of FIG. 3, the processing relating to an image signal executed in the image display device 1 is described in further detail.

When an image signal is inputted to the input terminal 11, it is determined whether a signal format of this image signal is the component format or the analog RGB format (step S1). As described earlier, this determination is made in accordance with settings made beforehand by the user.

In a case where the image signal is determined to be in the component format ("component format" at step S1), the scaling portion 16 determines (identifies) a piece of timing information corresponding to synchronization signals (HS, VS) transmitted from the synchronization circuit 15 and readouts the piece of timing information. That is, timing information whose horizontal frequency and a vertical frequency values coincides with (or most proximate to) those of said synchronization signal is selected from among information on the timing information table.

Since timings of an image signal of the component format is known to conform to the EIA standard, only timing information based on the EIA standard is used for the determination. Through the processing up to this point, the piece of timing information based on the EIA standard, which corresponds to the inputted image signal (input signal), is readout (step S11).

Then, using the piece of timing information thus read, the scaling portion 16 executes the predetermined signal processing to the image signals (R, G, and B luminance signals transmitted from the color matrix circuit 14 and HS and VS synchronization signals) (step S12). This signal processing includes image data capturing, scaling processing, image quality correction (gamma correction, contrast correction, etc.), and the like. In this signal processing, the individual timings of the image signals are treated assuming that they correspond with the piece of timing information readout. The image signals which the above-described signal processing is executed are transmitted to the image display portion 17 where an image represented by the image signals is displayed.

The processing of step S12 is executed continuously until a time that processing of the image signals should be halted (step S13). In a case where, for example, the user instructs to halt the displaying of an image, image signal input is interrupted, or the power is turned off, the processing of step S12 is halted (Y at step S13).

On the other hand, also in a case where, in the processing at step S1 described earlier, an inputted image signal is determined to be in the analog RGB format ("analog RGB format" at step SD, the scaling portion 16 determines (identifies) a piece of timing information corresponding to synchronization signals (HS, VS) transmitted from the synchronization circuit 15 and reads the piece of timing information. That is, the piece of timing information whose horizontal frequency and vertical frequency values coincide with (or most proximate to) those of the synchronization signals (HS, VS) is selected from among information on the timing information table.

However, since an image signal of the analog RGB format conforms to wide variety of standards, it is difficult to identify a standard to which timings of the image signal conform, or to identify timing information to which it corresponds accurately. Thus, timing information based on the VESA standard, which is the typical of timings conforming to the analog RGB format, is used tentatively for the determination. Through the processing up to this point, the piece of timing information based on the VESA standard which conforms with the inputted image signal (the timing information which is presumed to be most approximate), is read (step S21). As for the determination, timing information based on a standard other than the VESA standard may be used also.

Then, by using the piece of timing information thus read, the scaling portion 16 executes a predetermined signal processing to image signals (luminance signals R, G, and B transmitted from the color matrix circuit 14, and synchronization signals HS and VS) (step S22). The signal processing described here includes image data capturing, scaling processing, image quality correction (gamma correction, contrast correction, etc.), and the like. In this signal processing, the individual timings of the image signals are treated on the assumption that they comply with the read piece of timing information. The image signals in which the signal processing is executed are transmitted to the image display portion 17 where an image represented by the image signals is displayed.

In the processing at step S12 and step S22 described earlier, when a read piece of timing information conforms with an image signal to be processed, an image is displayed appropriately in a predetermined position (a predetermined region relative to the center of a display) on the image display portion 17. If not, however, appropriate capturing of image data might be hampered for example, and this may cause troubles that an image is displayed in a position deviated from a predetermined position or that noise is seen in the image, as a result.

In this respect, although in the processing at step S22, a piece of timing information based on the VESA standard is read tentatively as the information corresponding to an image signal, in reality, this information may not correspond to the image signal accurately.

In order to solve the above-described problem, in the image display device 1, concomitantly with the processing at step S22, processing of adjusting a read piece of timing information is executed as follows. That is, when an execution of the automatic adjustment of timing information is instructed from the user (Y at step S23), the automatic adjustment of a piece of timing information is executed in accordance with a display state of an image (step S24). According to this automatic adjustment, the read piece of timing information is adjusted automatically so that an image displayed on the image display portion 17 satisfies predetermined conditions (conditions such as, for example, whether the image is displayed properly in a predetermined position of the display, or whether the amount of flickering of the image does not exceed a predetermined threshold value).

The above-described automatic adjustment can be performed using various known methods. For example, a method, in which a so-called clock adjustment, phase adjustment, horizontal position adjustment, and vertical position adjustment are executed automatically, can be adopted. Here, the phase adjustment is for adjusting a phase shift in timings to be sampled, and is performed in the order of one dot or less.

Furthermore, if the user instructs to execute a manual adjustment of timing information (Y at step S25), the adjustment (manual adjustment) of a piece of timing information based on the user's settings (instruction) is executed (step S26). According to this manual adjustment, the user can adjust the respective values of the timing information while viewing the display (a display state of an image), through the operation portion 20. Thus, the read piece of timing information can be adjusted so that the user's desired display state of an image is realized. Further, this manual adjustment allows an additional adjustment even after the automatic adjustment (step S24) is performed, when the user's desired image quality is not obtained.

Figure 6:
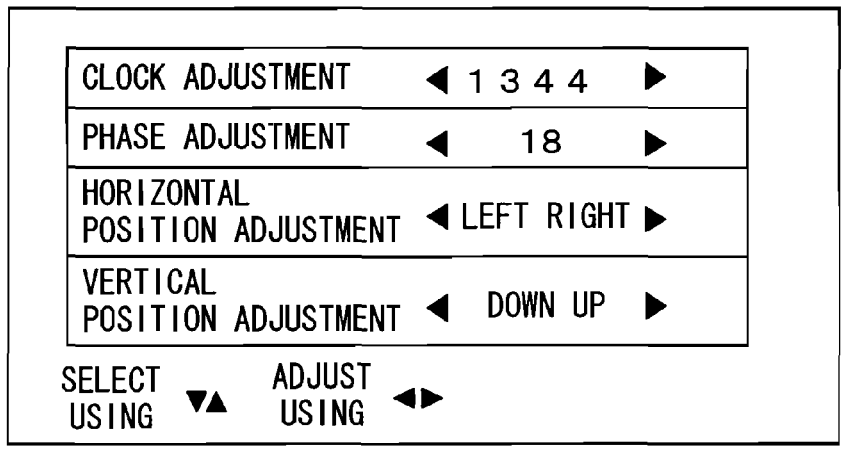
[FIG. 6] is an explanatory diagram relating to adjustment processing (manual adjustment) of timing information.

Further, in the above-described manual adjustment, a display image as shown in FIG. 6, for example, may appear at the user's request. In this case, the user can operates the operation portion 19 in accordance with this display image, and thus the clock adjustment, the phase adjustment, the horizontal position adjustment, and the vertical position adjustment is executed easily. Typically, the clock adjustment or the phase adjustment is executed for the purpose of suppressing the occurrence of vertical stripes or flickers on the screen, and the horizontal or vertical position adjustment is executed for the purpose of moving a display position of an image in a horizontal or vertical direction, respectively.

According to the above-described automatic adjustment and manual adjustment of timing information, an adjustment of, among a read piece of timing information, information of at least one of a dot clock, total horizontal dots, a horizontal display period, a horizontal front porch, a horizontal back porch, total vertical lines, a vertical display period, a vertical front porch, and a vertical back porch is allowed. For example, when performing the horizontal position adjustment, a horizontal front porch, a horizontal back porch, and the like are adjusted for the achievement of the horizontal position adjustment.

Figure 7:
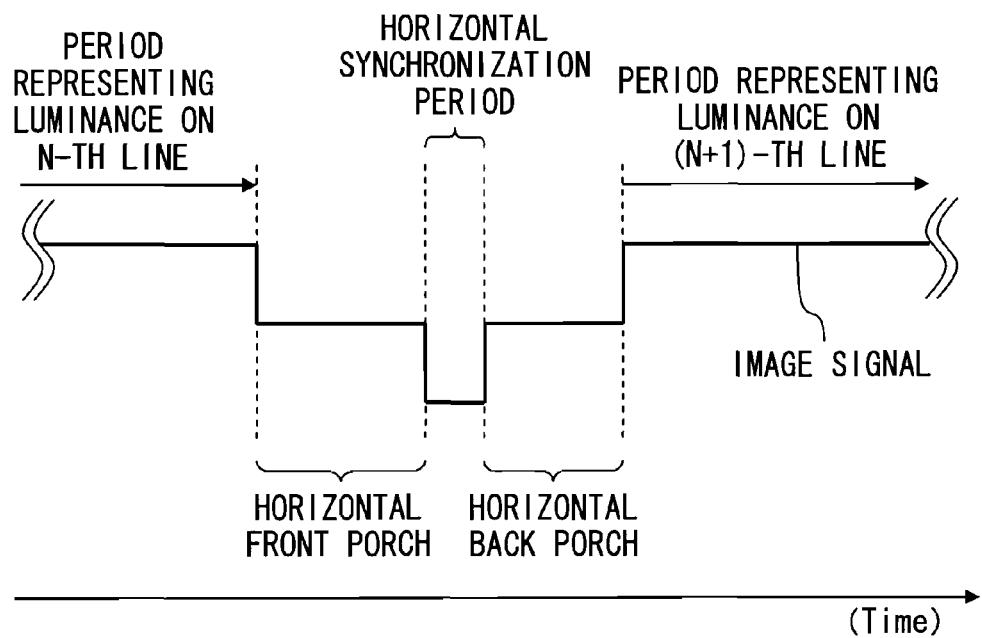
[FIG. 7] is an explanatory diagram relating to a state of an image signal.

The adjustment of a horizontal front porch or a horizontal back porch may mean to adjust relative timing between a horizontal synchronization signal and a luminance signal. FIG. 7 schematically shows the state of an image signal to which the adjustment etc. is executed. As shown in the figure, a horizontal front porch corresponds to a period between the end of a period representing luminance and the beginning of a horizontal synchronization period, and a horizontal back porch corresponds to a period between the end of the horizontal synchronization period and the beginning of a period representing luminance. In the image display device 1, among a read piece of timing information, information of a resolution, a horizontal frequency, and a vertical frequency are not adjustable.

Series of processing from step S22 to step S26 are executed continuously until a time that the processing of the image signals should be halted (step S27). When the user instructs the halt of the image displaying, when the image signal input is interrupted, or when the power is turned off, these processing are halted (Y at step S27). During the time after the startup of the image display device 1 or at a time the image signal is inputted, the automatic adjustment of timing information (processing corresponding to step S24) may be executed regardless of the existence of the user's instruction. In such case, the automatic adjustment of timing information according to the user's instruction (step S23, step S24) may be omitted.

In a case where an inputted image signal is determined to be in the component format ("component format" at step S1), it can be said that the above-described adjustment of timing information is not required essentially. Thereby, the image display device 1 is set so that, an instruction of executing the adjustment of timing information is not accepted in this case, and thus such adjustment is not executable (disabled).

This allows an omission of processing relating to the adjustment of timing information and thus can minimize the processing load. This can also avoid the situation where the adjustment rather hinders appropriate processing of an image signal, and hampering an optimum image display due to inappropriate adjustment caused by some reason.

As for a method determining a signal format of an inputted image signal, there is known a conventional method in which a determination is made based on a horizontal frequency and a vertical frequency of the image signal. However, there is a case where signals having a different signal formats from each other (the component format or the analog RGB format) are extremely analogous in terms of a horizontal frequency and a vertical frequency. For example, a 1280×720 signal (60 Hz) of the CVT standard and a 720p signal (60 Hz) of the EIA standard are almost identical in terms of a horizontal frequency and a vertical frequency. The same is true with a VGA 640×480 signal (60 Hz) of the VESA standard and a 480p signal of the EIA standard.

According to the reason described above, the method for determining a signal format based on a horizontal frequency and a vertical frequency may not yield an accurate result of the determination. Thus, there has been a demand for a method for determining a signal format, which can achieve a determination in an increased accuracy.

In this respect, in the image display device 1 according to this example, a signal format of an inputted image signal is determined based on information inputted by a user. Thus, by an appropriate (accurate) input of information by the user, a signal format of an inputted image signal can be determined appropriately.

EXAMPLE 2

Next, the following describes another embodiment (Example 2) of the present invention also by referring to an image display device. This example is basically the same as Example 1 except for how a signal format of an image signal is determined and thus is described with duplicate descriptions omitted. As described in the following, this example is different from Example 1 in that a determination of a signal format of an input signal is executed based on the result of detection by a terminal connection detection portion 21.

Figure 4:
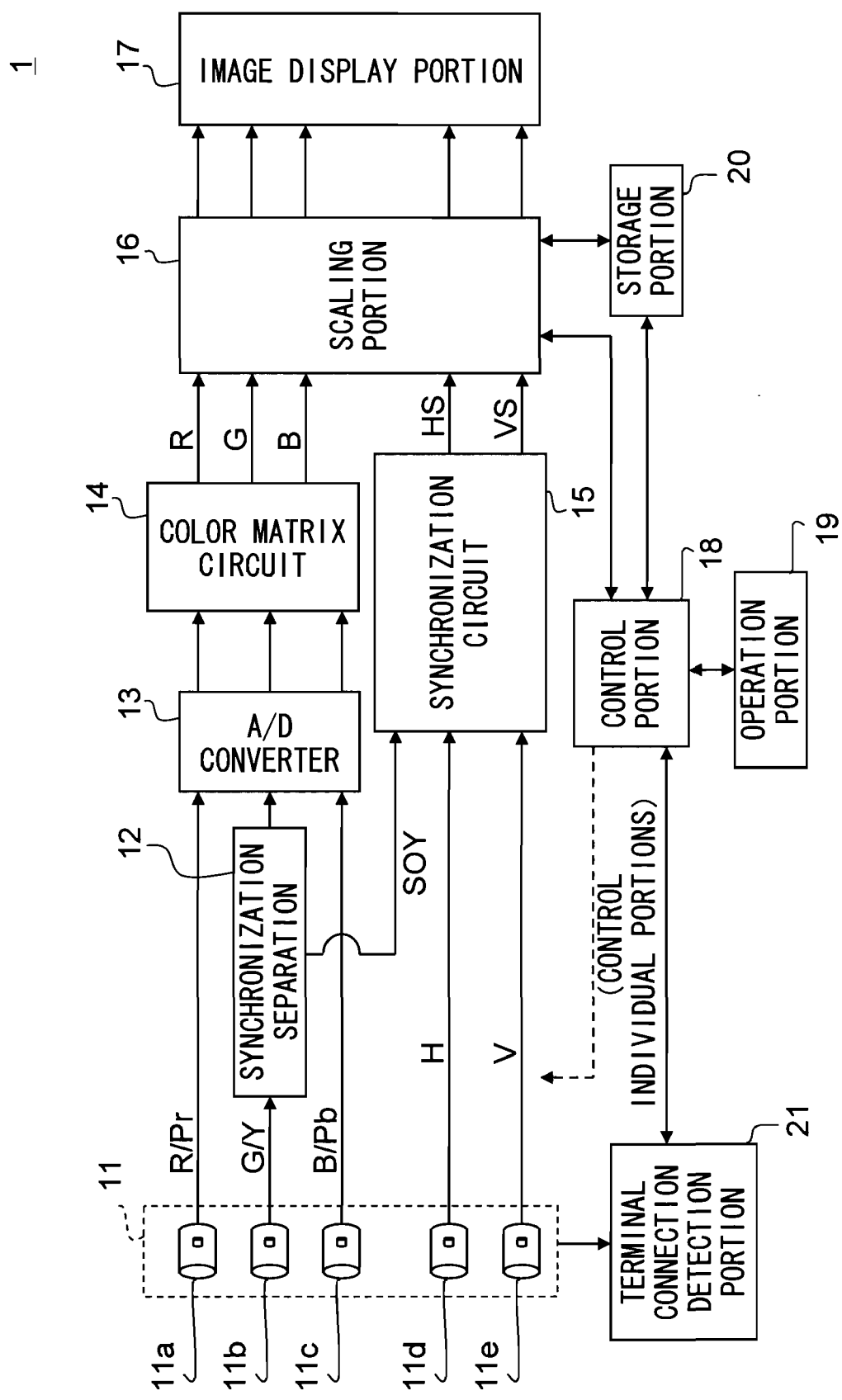
[FIG. 4] is a structural view of an image display device relating to Example 2 of the present invention.

FIG. 4 shows a structural view (block diagram) of an image display device according to this example. As shown in the figure, an image display device 1 is provided with the terminal connection detection portion 21. The terminal connection detection portion 21 detects a connection state of an input terminal group 11, i.e. which ones of terminals (11a to 11e) are connected to terminals of an external device, and transmits the result of this detection to a control portion 18.

The above-described detection of a connection state is performed, for example, in the following manner. That is, the terminals (11a to 11e) are each formed in a convex shape with a predetermined diameter, and a small-sized switch depressible under an external force from the outside is provided on a side surface of this convex-shaped portion. The terminals of the external device, which are each formed in a concave shape with a diameter somewhat smaller than that of the convex portion, are engaged with the terminals (11a to 11e), thereby establishing a connection between the terminals of the external device and the terminals (11a to 11e). The small-sized switch thus is being depressed in a state where these terminals are connected, while not being depressed in a state where these terminals are not connected.

The terminal connection detection portion 21 therefore detects whether or not the small-sized switches of the individual terminals (11a to 11e) are being depressed thereby to detect a connection state of the input terminal group 11. That is, the connection state of the terminals is detected using a mechanical method. A method for detecting a connection state by the terminal connection detection portion 21, however, is not limited to this method and other methods also may be used for the detection.

In Example 2, the processing corresponding to step S1 described in Example 1 (processing of determining whether a signal format of an input signal is the component format or the analog RGB format) is executed based on, instead of settings made beforehand by the user, the result of detection by the terminal connection detection portion 21.

That is, in a case where the shared terminals (11a, 11b, 11c) are connected to the terminals of the external device and the analog RGB dedicated terminals (11d, 11e) are not connected thereto, an image signal inputted from the external device is expected to be in the component format. Thus, in the processing corresponding to step S1, a signal format of an input signal is determined to be the component format.

On the other hand, in a case where all the first to fifth terminals (11a to 11e) are connected to the terminals of the external device, an image signal inputted from the external device is expected to be in the analog RGB format. Thus, in the processing corresponding to step S1, a signal format of an input signal is determined to be the analog RGB format.

The detection of a connection state of the terminals performed by the terminal connection detection portion 21 also may take other forms in terms of the types of the terminals. For example, it also is possible that a connection state of only the analog RGB dedicated terminals (11d, 11e) is detected. In this case, when no connection is detected, it is determined that a signal of the component format is being inputted, and when a connection is detected, it is determined that a signal of the analog RGB format is being inputted.

In the image display device 1 according to this example, a signal format of an inputted image signal is determined based on presence or absence of a signal inputted to the analog RGB dedicated terminals (11d, 11e). Thus, a signal format of an inputted image signal can be determined automatically and appropriately.

EXAMPLE 3

Next, the still another embodiment (Example 3) of the present invention is described also by referring to an image display device. This example is basically the same as Example 1 except for the determination of the signal format of an image signal. Thus the duplicative descriptions are omitted. As described in the following, this example is differs from Example 1 in that the determination of a signal format of an input signal is executed based on the result detected by a signal detection portion 22.

Figure 5:
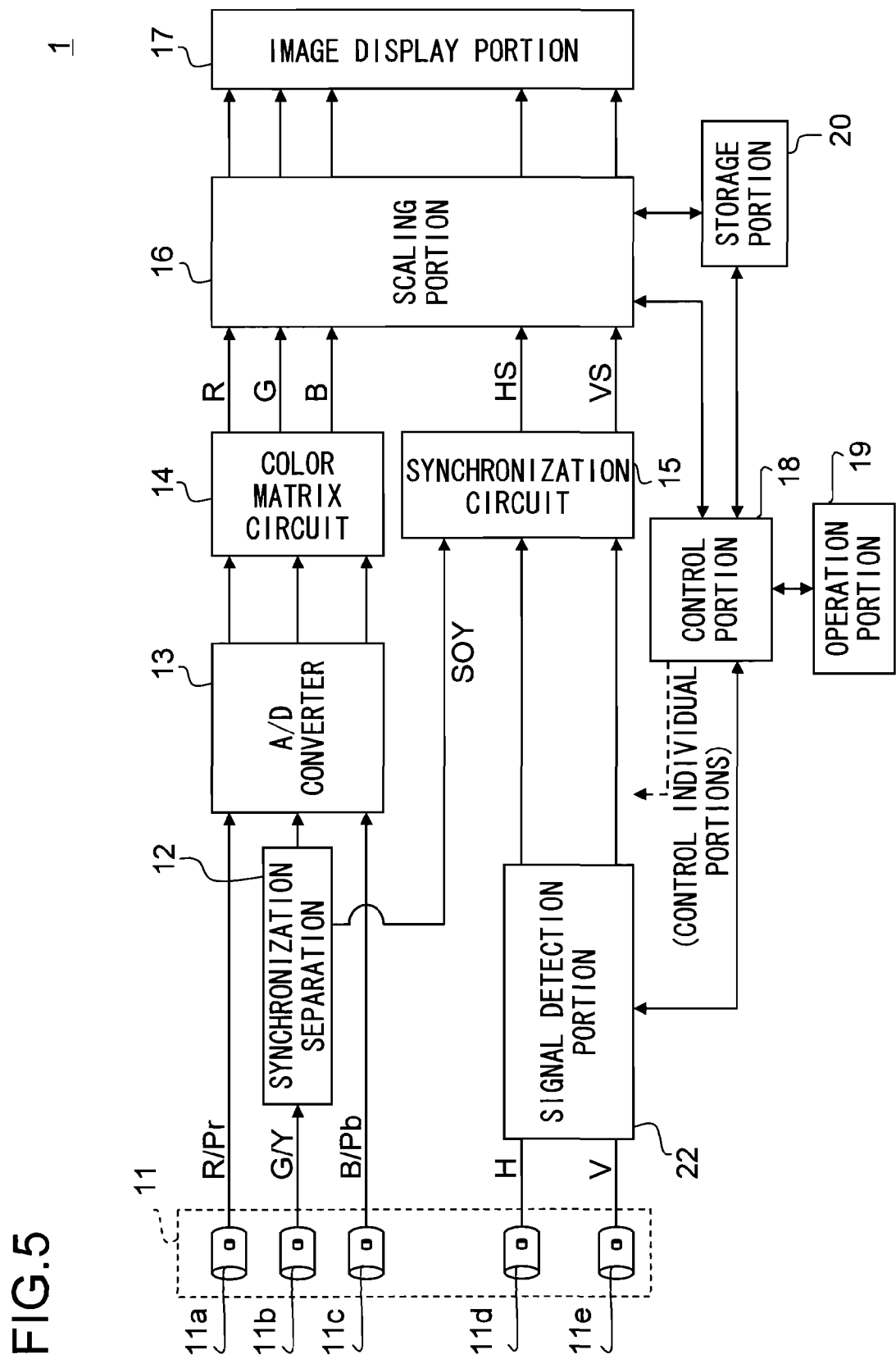
[FIG. 5] is a structural view of an image display device relating to Example 3 of the present invention.

FIG. 5 shows a structural view (block diagram) of an image display device of this example. As shown in the figure, an image display device 1 is provided with the signal detection portion 22. The signal detection portion 22 is provided in the downstream of fourth and fifth terminals (11d, 11e) (i.e. analog RGB dedicated terminals), and detects whether or not the signal is inputted to these terminals. The signal detection portion 22 then transmits the result of the detection to a control portion 18. The inputted signal is transmitted to the downstream side (a synchronization circuit 15) without any signal processing.

In Example 3, the processing corresponding to the step S1 described in Example 1 (processing of determining whether a signal format of an input signal is the component format or the analog RGB format) is executed based on the result detected by the signal detection portion 22, instead of the settings made beforehand by the user.

That is, when no signal input is detected by the signal detection portion 22, an image signal inputted from an external device is assumed to be in the component format. Thus, in the processing corresponding to step S1, the signal format of the input signal is determined to be the component format.

On the other hand, when signal input is detected by the signal detection portion 22, an image signal inputted from the external device is assumed to be in the analog RGB format. Thus, in the processing corresponding to step S1, the signal format of the input signal is determined to be the analog RGB format.

The signal detection portion 22 may also be configured to detect whether or not there is signal input to one of the fourth terminal 11d and the fifth terminal 11e only. Also in this case, it may be determined that the signal of the component format is being inputted when no signal input is detected, and may be determined that a signal of the analog RGB format is being inputted when signal input is detected.

The signal detection portion 22 may also be configured so as not to detect the input of signals other than synchronization signals. Thereby, even if a noise signal is inputted to the terminals (11d, 11e) for some reason, it can prevent an erroneous determination of a signal format of an input signal due to the noise signal.

According to the image display device 1 of this example, a signal format of an inputted image signal is determined based on whether or not the analog RGB dedicated terminals (11d, 11e) are connected to an external device. Thus, according to the image display devices 1 described thus far, a signal format of an inputted image signal can be determined automatically and appropriately.

The foregoing has described the embodiments of the present invention without limiting the invention thereto. The present invention may be embodied in other various forms without departing from the spirit of the invention.

The invention claimed is:

1. An image signal control device comprising:
   an input portion having a shared terminal configured for inputting a component signal and a RGB signal;
   an adjustment portion configured to adjust a timing of the input signal, the adjustment portion including:
      an automatic adjustment portion configured to adjust the timing in accordance with a display state of an image, and
      a manual adjustment portion configured to adjust the timing in accordance with a manual input, the manual adjustment portion being disabled when the input signal is the component signal;
   a display control portion, configured to perform display control based on a predefined standard when the input signal is the component signal and based on the adjusted signal when the input signal is the RGB signal;

a format determination portion configured to determine whether an input signal has a component format or an analog RGB format;

a timing identification portion configured to identify timing information corresponding to the input signal, the timing information being pre-registered information relating to image signal timing;

a timing adjustment portion configured to adjust the input signal based on the timing information identified by the timing identification portion when the input signal has an analog RGB format; and a signal processing portion configured to process the input signal based on the timing information identified by the timing identification portion.

2. The image signal control device according to claim 1, wherein the predefined standard is an EIA standard.

3. The image signal control device according to claim 1, wherein the display control portion determines whether the input signal is the RGB signal or the component signal based on a user's designation.

4. The image signal control device according to claim 1, wherein:
the RGB signal is constituted of R, G, B, H, and V signals, and
the device is configured to determine whether the input signal is the RGB signal or the component signal based on presence or absence of the H and V signal.

5. The image signal control device according to claim 1, wherein
the shared terminal of the input portion comprises five input terminals and can accept an input of the component signal constituted of a luminance signal Y and color difference signals PB and PR, as well as the RGB signal constituted of R, G, B, H, and V signals, and
when three of the five terminals are connected, the device determines that the component signal is being inputted, and when four or more of the five terminals are connected, the device determines that the RGB signal is being inputted.

6. An image display device comprising the image signal control device according to claim 1 and
a display portion configured to display an image based on the processed signal.

7. The image display device according to claim 6, wherein the timing information includes information regarding to a horizontal frequency and a vertical frequency and further includes information regarding to at least one of a dot clock, total horizontal dots, a horizontal display period, a horizontal front porch, a horizontal back porch, total vertical lines, a vertical display period, a vertical front porch, and a vertical back porch.

8. The image display device according to claim 7, wherein the adjustment is enabled in terms of, among the timing information, the information of at least one of a dot clock, total horizontal dots, a horizontal display period, a horizontal front porch, a horizontal back porch, total vertical lines, a vertical display period, a vertical front porch, and a vertical back porch.

9. The image display device according to claim 6, wherein the input portion comprises an analog RGB-dedicated terminal configured for inputting the image signal of the analog RGB format but not for inputting the image signal of the component format, and
the format determination portion determines the signal format of the inputted image signal based on presence or absence of a signal inputted to the analog RGB dedicated terminal.

10. The image display device according to claim 6, wherein the input portion comprises an analog RGB-dedicated terminal configured for inputting the image signal of the analog RGB format but not for inputting the image signal of the component format, and
the format determination portion is configured to determine the format of the input signal based on whether or not the analog RGB-dedicated terminal is connected to an external device.

11. The image display device according to claim 6, wherein the format determination portion is configured to determine the format of the input signal based on manually inputted information.

12. The image display device according to claim 6, wherein the timing adjustment portion is further configured to adjust the input signal based on one of a manually input instruction and a display state of the image.

13. An image display-signal control device comprising:
an input portion configured for inputting a component signal and a RGB signal;
an adjustment portion configured to adjust a timing of the input signal, the adjustment portion including:
an automatic adjustment portion configured to adjust the timing in accordance with a display state of an image, and
a manual adjustment portion configured to adjust the timing in accordance with a manual input, the manual adjustment portion being disabled when the input signal is the component signal;
a display control portion, configured to perform display control based on a predefined standard when the input signal is the component signal and based on the adjusted signal when the input signal is the RGB signal;
a format determination portion configured to determine whether an input signal has a component format or an analog RGB format;
a timing identification portion configured to identify timing information corresponding to the input signal, the timing information being pre-registered information relating to image signal timing;
a timing adjustment portion configured to adjust the input signal based on the timing information identified by the timing identification portion when the input signal has an analog RGB format; and
a signal processing portion configured to process the input signal based on the timing information identified by the timing identification portion.

* * * * *

UNITED STATES PATENT AND TRADEMARK OFFICE
CERTIFICATE OF CORRECTION

PATENT NO. : 8,345,029 B2  
APPLICATION NO. : 12/959326  
DATED : January 1, 2013  
INVENTOR(S) : Tomonori Yoshida, Jiaqiang Sun and Chunping Liao Page 1 of 1

It is certified that error appears in the above-identified patent and that said Letters Patent is hereby corrected as shown below:

On the Title Page: Item (73)

SANYO Electric CO., Ltd.  
Osaka, Japan should read

SANYO TECHNOLOGY CENTER (SHENZHEN) CO., LTD.  
SHENZHEN, CHINA

Signed and Sealed this  
Sixth Day of May, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,345,029 B2
APPLICATION NO. : 12/959326
DATED : January 1, 2013
INVENTOR(S) : Tomonori Yoshida, Jiagiang Sun and Chunping Liao It is certified that error appears in the above-identified patent and that said Letters Patent is hereby corrected as shown below:

On the Title Page: Item (73)

SANYO Electric CO., Ltd.
Osaka, Japan should read

SANYO Electric CO., Ltd.
Osaka, Japan

SANYO TECHNOLOGY CENTER (SHENZHEN) CO., LTD.
SHENZHEN, CHINA

Signed and Sealed this
Twenty-fourth Day of November, 2015

Michelle K. Lee
*Director of the United States Patent and Trademark Office*